Figure 1:
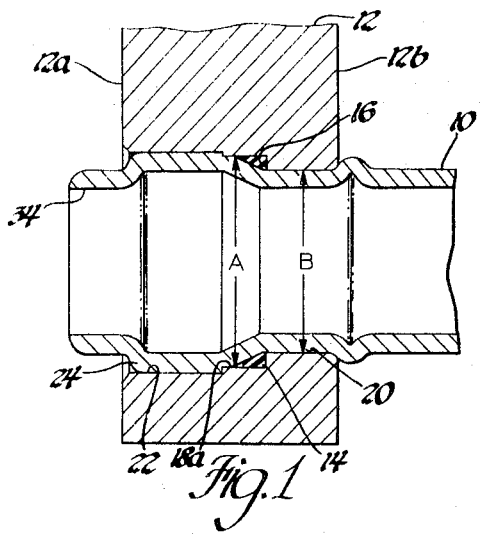

United States Patent
Pasek et al.

[11] 3,787,945
[45] Jan. 29, 1974

[54] METHOD OF FABRICATING AN EXPANDED TUBE CONNECTION

[75] Inventors: James E. Pasek; James M. Shea; Michael F. Tobin, all of Saginaw, Mich.

[73] Assignee: General Motors Corporation, Detroit, Mich.

[22] Filed: May 14, 1973

[21] Appl. No.: 360,031

Related U.S. Application Data

[62] Division of Ser. No. 254,560, May 18, 1972, abandoned.

[52] U.S. Cl............... 29/157.4, 29/523, 285/222, 285/382.5
[51] Int. Cl....................... B21d 53/02, B23p 15/26
[58] Field of Search... 29/157.4, 523; 285/222, 382, 285/382.1, 382.2, 382.4, 382.5

[56] References Cited
UNITED STATES PATENTS

| | | | |
|---|---|---|---|
| 2,179,248 | 11/1939 | Bandish et al. | 285/382.5 X |
| 2,450,581 | 10/1948 | Couty | 285/382.5 X |
| 2,477,676 | 8/1949 | Woodling | 29/523 UX |
| 2,832,130 | 4/1958 | Harvey | 29/523 X |
| 3,326,006 | 6/1967 | Mount | 285/382.5 X |
| 3,428,338 | 2/1969 | Corwin | 29/157.4 X |
| 3,534,988 | 10/1970 | Lindsey | 29/523 X |
| 3,715,800 | 2/1973 | Leopold et al. | 29/523 X |

FOREIGN PATENTS OR APPLICATIONS

| | | | |
|---|---|---|---|
| 683,803 | 9/1966 | Belgium | 285/382.4 |
| 1,801,294 | 5/1970 | Germany | 285/382 |

*Primary Examiner*—Charles W. Lanham
*Assistant Examiner*—D. C. Reiley, III
*Attorney, Agent, or Firm*—Arthur N. Krein

[57] ABSTRACT

An expanded tube connection and method wherein a relative thin-walled tube extending through a counterbored tube block is upset on one side of the tube block to lock the tube to the tube block and wherein the tube is expanded within the apertured tube block to lock it to the tube block while at the same time providing a predetermined size cavity between the tube and the tube block for an O-ring seal.

5 Claims, 6 Drawing Figures

PATENTED JAN 29 1974 3,787,945

METHOD OF FABRICATING AN EXPANDED TUBE CONNECTION

This is a Division of U.S. Ser. No. 254,560, filed May 18, 1972, now abandoned.

This invention relates to an expanded tube connection and method of making the same and, in particular, to an expanded tube and O-ring seal connection of a tube to an apertured tube block.

It is well known in the art to secure a tube to a tube block either by welding, brazing or otherwise fixing a tube directly to a tube block or to secure such a tube by the use of a threaded coupling arrangement incorporating a seal means to connect the tube to a tube block in order to provide a fluid-tight connection therebetween. In certain applications, these methods of securing a tube to a tube block are undesirable, for example, when welding or brazing is undesirable because of the material being used in either the tube or tube block.

In copending U.S. Pat. application Ser. No. 254,561, filed concurrently herewith on May 18, 1972, and assigned to the same assignee as that of the subject application, there is disclosed an improved beaded tube with O-ring seal connection by means of which a tube is mechanically fixed against axial and rotative movement in a tube block and is in sealed relation therewith by means of an O-ring seal jammed between an annular bead on the tube, a radial wall in the tube block and an axial extending bored cylindrical wall portion of the tube block. However, in this beaded tube with O-ring seal connection, the compression of the O-ring seal will vary depending on the buckling of the tube while forming the annular bead on the tube.

It is therefore the principal object of this invention to provide an improved tube connection arrangement and the method of making the same whereby a tube is mechanically fixed by deformation of the tube in a counterbored opening in a tube block, the tube deformation being accomplished in a controlled manner to provide a proper sized O-ring cavity between the tube and the tube block for an O-ring seal of predetermined size.

Another object of this invention is to provide a method of forming a tube connection by means of which a leak-proof rigid connection is effected between a thin-walled tube and a tube block with a controlled size O-ring cavity formed therebetween.

These and other objects of the invention are attained by providing a stepped bore in a tube block, inserting a thinwalled tube through the stepped bore with an Oring gasket encircling the tube within the enlarged portion of a stepped bore and then expanding the tube within the stepped bore to mechanically lock these portions of the tube to the tube block and upsetting the tube on one side of the tube block to provide a bead on the tube in engagement with the tube block, the O-ring being compressed between the expanded tube and a wall of a stepped bore within the tube block.

For a better understanding of the invention, as well as other objects and further features thereof, reference is had to the following description of the invention to be read in connection with the accompanying drawings, wherein:

FIG. 1 is a sectional view of the expanded tube connection of the invention showing the configuration of the tube as fixed to a tube block; and, FIGS. 2, 3, 4, 5 and 6 are sequential views of the process steps used to fabricate the tube connection shown in FIG. 1.

Referring first to FIG. 1, a tube 10 is shown secured to a tube block 12 in accordance with the invention, an O-ring seal or gasket 14 being positioned to provide a seal between the tube 10 and the tube block 12. The tube 10 is preferably of thin-wall construction and made of a suitable ductile material, such as aluminum. The tube block 12 can be made of any suitable material as desired, for example, aluminum when used with an aluminum tube and, the tube block may be a separate element, as shown, or it may be part of a manifold assembly having a plurality of tubes secured thereto.

Figure 2:
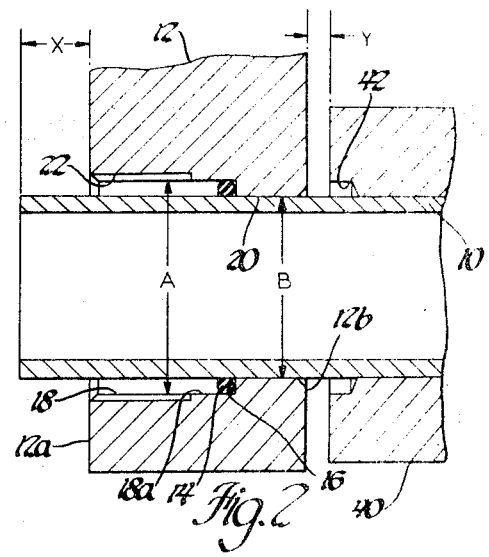

As shown, tube block 12 is provided with a through counterbore or stepped bore consisting of opposed first and second bores of different sizes extending from opposite surface portions or walls 12a and 12b of the tube block and meeting coaxially with a shoulder or radial wall 16. The first bore extending from the wall 12a is of a diameter substantially greater than the nominal outside diameter of the tube 10 to provide a cylindrical wall portion 18 of a diameter A as shown in FIG. 2. The second bore of reduced diameter forms a cylindrical wall portion 20 of a diameter B, as seen in FIG. 2, extending from the wall 12b of the tube block, the diameter of the cylindrical wall portion 20 being preferably only slightly larger than the nominal outside diameter of the tube 10 to slidably receive the tube therein during the assembly of the tube to the tube block in a manner to be described. The shoulder or radial wall 16 extends radially inward from the cylindrical wall portion 18 at a suitable angle to the axis of the counterbore, in the embodiment illustrated, this being at right angle thereto.

The cylindrical wall potion 18 is also preferably provided with circumferentially spacec axial slots or notches 22 to receive the radial outward extending tube anti-rotation locks 24 on the exterior of tube 10 whereby this tube is held against rotation relative to the tube block. It is, of course, to be realized that the axial slots or notches 22 could alternately, not shown, be formed in the cylindrical wall portion 20. In the embodiment illustrated, the slots or notches 22 are in the form of broached splines or slots, six such slots being used in the embodiment illustrated. These slots are of a suitable axial length, but do not extend the full axial length of the cylindrical wall portion 18 so that a suitable portion 18a without serration therein remains to act as a seating surface for the seal ring 14. Thus, the first bore in the tube block can be referred to as a partially splined bore.

Tube 10, of a nominal outside diameter as desired, is provided after assembly to the tube block 12 with an external annular bead or upset portion 26 abutting against the surface 12b of the tube block 12, a first slightly enlarged annular diameter portion 28 in interference fit with the cylindrical wall portion 20 of the tube block, a second enlarged annular diameter portion 30 in interference fit with the cylindrical wall portion 18 of the tube block in inclined annular portion 32 between these enlarged portions 28 and 30, and a free end portion 34 of a suitable diameter as desired.

The outer surface of the inclined annular portion 32, the radial wall 16 and portion 18a of the tube block 12 form an annular seal ring cavity of a predetermined size for the sealing ring or gasket 14 to provide for the desired compression of the sealing ring whereby to provide a fluid-tight seal between the tube 10 and the tube block 12. The sealing ring or gasket 14 which is disposed in this seal ring cavity is preferably an O-ring seal but it may be a ring seal of any suitable cross section which is constructed of compressible material and is suitably dimensioned for the intended purpose.

Reference is now made to FIGS. 2 through 6, inclusive, which illustrate the preferred sequence of processing steps required to assemble the tube 10 to the tube block 12 to form the assembly shown in FIG. 1, these processing steps being as follows:

With reference to FIG. 2, the tube 10 is inserted into the stepped bore of the tube block 12 with the O-ring seal 14 positioned over the free end of the tube and moved thereon to a position in abutment against the radial wall 16 in the counterbore in the tube block 12. In the embodiment illustrated, the tube 10 is fixed relative to the tube block 12 by a stationary rear bead die 40 aving a bead cavity 42, the free end portion 34 of tube 10 extending a distance X, as seen in this figure, from the front face 12a of the tube block and, the tube block 12 is positioned a distance Y from the rear bead die 40.

Figure 3:
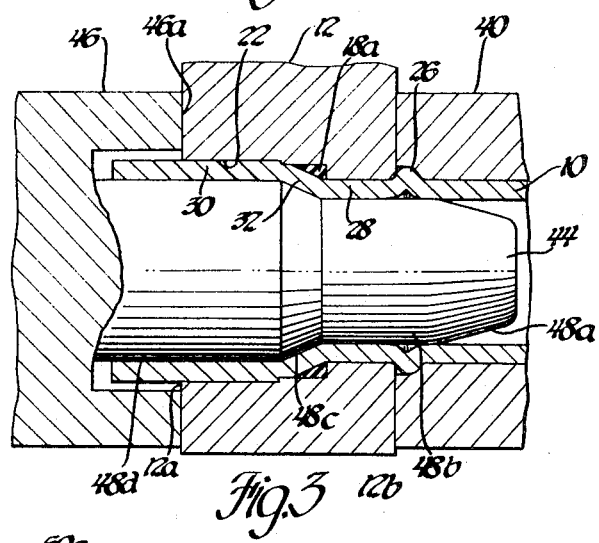

In the next step illustrated in FIG. 3, an expanding mandrel, generally designated 44, is inserted through the tube 10 inside diameter from its free end forcing tube material to extrude into the axial slots or notches 22 to form the antirotation locks 24 on the outer periphery of the tube and at the same time forming the enlarged diameter portions 28 and 30 and the inclined annular portion 32 therebetween, the enlarged diameter portions 28 and 30 being formed to provide an interference fit between the tube material of these portions and the cylindrical wall portions 20 and 18, respectively.

As shown in FIG. 3, the expanding mandrel 44 has a bullet nose 48a at its free end, a first diameter portion 48b and a second diameter portion 48d with an inclined shoulder portion 48c therebetween, the second diameter portion 48d being fixed or formed integral, as shown, at its base to a mandrel block 46. The diameters of the first and second diameter portions 48b and 48d, respectively, and their lengths in addition to the length and angle of the inclined shoulder portion 48c are selected so that the desired interference fit is obtained between the tube material and the tube block material with the shape and size of the seal ring cavity being determined by the inclined shoulder portion 48c and the depth of penetration of the expanding mandrel into the tube, the latter being controlled in the embodiment disclosed by engagement of the face of the mandrel block 46 against the tube block. With this arrangement for forming the inclined annular portion 32 of the tube relative to the radial wall 16 and the cylindrical wall portion 18, a specific predetermined compression can be obtained on the O-ring seal 14. The mandrel block 46 is provided with an annular cavity surrounding the base of the second diameter portion 48d of the expanding mandrel so as to receive the free end portion of the tube extending outward from the face 12a of the tube block during this processing step.

As shown in FIG. 3, as the expanding mandrel 44 with the mandrel block 46 is moved from left to right, as seen in this figure, the tube 10 is extruded and enlarged in the manner as described, and as the expanding mandrel 44 bottoms in the tube and block counterbore, the face 46a of the mandrel block contacts the tube block 12 forcing it to move through the previously identified distance Y, to the right as seen in FIG. 3, against the rear bead die 40 so as to form the annular bead 26 within the cavity 42 in the rear bead die 40.

Figure 4:
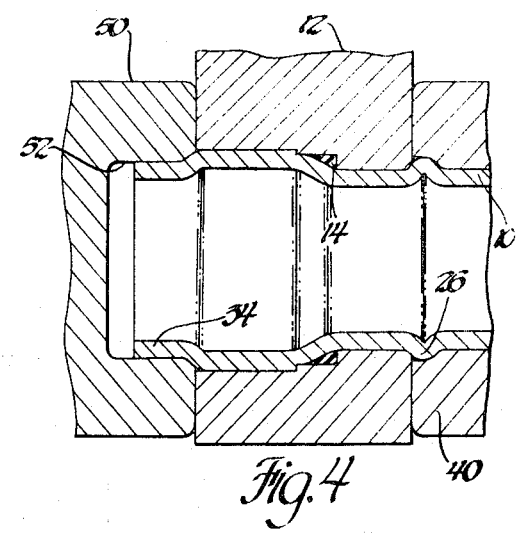
Figure 5:
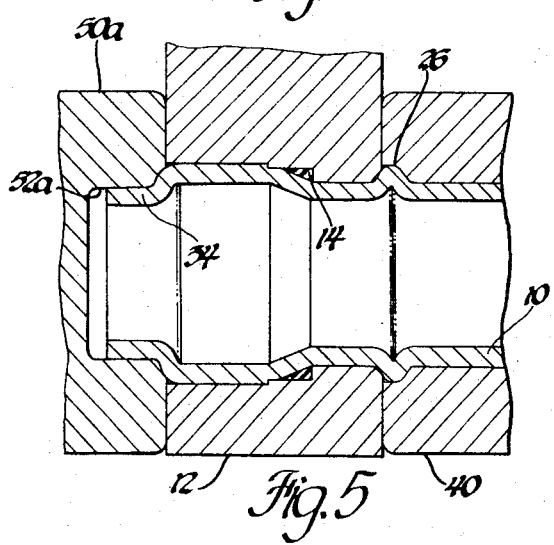

As shown in FIGS. 4 and 5, one or more sizing dies 50 and 50a, each having annular die cavities 52 and 52a, respectively therein, are then used to preswage the outer diameter of the free end portion of the tube to a predetermined outside diameter, as desired.

Figure 6:
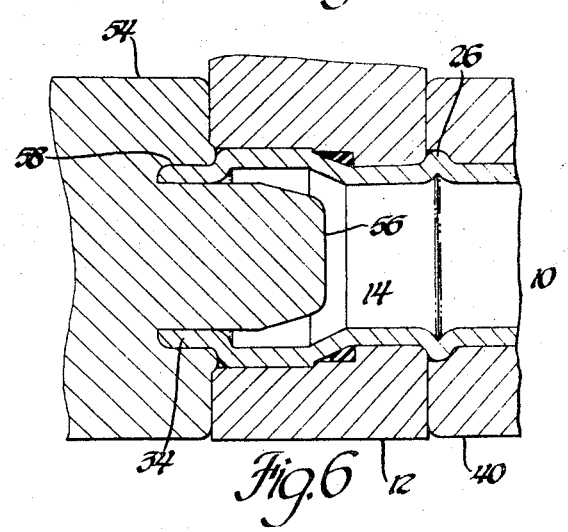

In the final processing step shown in FIG. 6, a sizing die 54 having a mandrel 56, which may be an expanding mandrel, and a ring-like die cavity 58 of desired internal diameter, external diameter and depth, is used to form the free end tube portion 34 to a particular inside diameter and outside diameter configuration, as desired.

It is apparent from the above description that, depending on the desired finished diameter of the free end portion 34 of tube 10, one or both of the process steps illustrated in FIGS. 4 and 5 could be eliminated with all of the sizing of the free end portion of the tube being done in the process step illustrated in FIG. 6. In addition, the process step in FIG. 6 could also be eliminated if sizing of the free end of the tube is not desired. It is also apparent that depending on the intended use of the subject tube to tube block connection, the bead 26 could be eliminated since the anti-rotation locks 24 would provide some axial as well as rotation integrity between the tube and the tube block.

What is claimed is:

1. The method of forming a tube to tube block connection wherein said tube block is provided with a through counterbore consisting of opposed coaxial first and second bores of different diameters extending from opposite sides of said tube block and joining coaxially with an intervening radial wall, said method comprising the steps of fixing said tube within said counterbore with an O-ring encircling said tube and positioned against said radial wall, inserting a stepped mandrel having first and second diameter portions thereon with an inclined shoulder portion therebetween into said tube a predetermined distance to expand said tube within said tube block to form enlarged diameter first and second portions thereof in interference engagement with said first and second bores, respectively, while at the same time forming an inclined annular portion on said tube between said enlarged diameter first and second portions so as to form with said first bore and said radial wall a seal ring cavity of predetermined size and configuration for said O-ring.

2. The method of forming a tube to tube block connection of claim 1 further including the step of forming an annular bead on said tube to abut against said tube block adjacent to said enlarged diameter second portion.

3. The method of forming a tube to tube block connection wherein said tube block is provided with a first surface portion and a second surface portion on opposite sides thereof and with a first partly splined bore in said tube block extending from said first surface and a second bore of reduced diameter in said tube block extending from said second surface and meeting coaxially with said first bore with an intervening shoulder therebetween; said method comprising the steps of fixing said tube within said first partly splined bore and said second bore with an O-ring encircling said tube and positioned against said intervening shoulder, inserting a stepped mandrel having first and second diameter portions with an inclined shoulder portion therebetween into said tube a predetermined distance to expand and extrude said tube within said tube block to form enlarged diameter first and second portions thereof in interference engagement with said first partly splined bore and said second bore, respectively, and to form an inclined annular portion on said tube between said enlarged diameter first and second portions extending into said first partially splined bore so as to form with said first partly splined bore and said intervening shoulder a seal ring cavity of predetermined size and configuration for said O-ring.

4. The method of forming a tube to tube block connection according to claim 3 including the step of forming an external annular bead on said tube externally of said tube block in abutment against said second surface portion of said tube block.

5. The method of forming a tube to tube block connection according to claim 3 including the step of reforming a free end of said tube adjacent to said enlarged diameter first portion and outside said tube block to a diameter less than the diameter of said enlarged diameter first portion.

* * * * *